(12) United States Patent
Pardo et al.

(10) Patent No.: US 6,456,387 B1
(45) Date of Patent: Sep. 24, 2002

(54) PRINTING METHOD AND APPARATUS

(75) Inventors: Luis Trabb Pardo, Palo Alto; Jorge Phillips, Menlo Park, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/458,684

(22) Filed: Jun. 2, 1995

Related U.S. Application Data

(62) Division of application No. 07/898,532, filed on Jun. 15, 1992.

(51) Int. Cl.[7] .............................................. G06K 15/00
(52) U.S. Cl. ..................................... 358/1.13; 358/1.15
(58) Field of Search ................................ 395/112, 114, 395/115, 116, 164, 165, 166, 507–517, 521; 358/404, 444, 261.1; 364/550; 345/507–517, 521; 702/186, 187

(56) References Cited

U.S. PATENT DOCUMENTS

| | | | |
|---|---|---|---|
| 3,895,184 A | * 7/1975 | Komura et al. ......... 358/261.1 |
| 4,476,542 A |  10/1984 | Crean et al. ............... 364/900 |
| 4,811,249 A | * 3/1989 | Marsh ....................... 364/550 |
| 4,941,108 A |  7/1990 | Aoyagi et al. ............ 364/519 |
| 5,068,805 A | * 11/1991 | Tsuzuki ..................... 395/164 |
| 5,129,049 A | * 7/1992 | Cuzzo et al. .............. 395/112 |
| 5,159,681 A | * 10/1992 | Beck et al. ................ 395/425 |
| 5,347,368 A | * 9/1994 | Mochizuki ................. 358/404 |
| 5,382,968 A | * 1/1995 | Endoh ....................... 395/114 |
| 5,406,383 A |  4/1995 | Tanaka ...................... 358/401 |

OTHER PUBLICATIONS

US 5,206,741, 4/1993, Shimura et al. (withdrawn)*

* cited by examiner

*Primary Examiner*—Gabriel Garcia
(74) *Attorney, Agent, or Firm*—Fitzpatrick, Cella, Harper & Scinto

(57) ABSTRACT

A printing apparatus which predicts resource usage for a printing operation, determines whether resources available in the printing apparatus are sufficient for the predicted usage, and changes the printing operation in the case where it is determined that there are insufficient resources available for the currently-specified printing operation so that it is possible to print the image within existing resource constraints.

56 Claims, 9 Drawing Sheets

PRINTING METHOD AND APPARATUS

This application is a division of application Ser. No. 07/898,532 filed Jun. 15, 1992, pending.

BACKGROUND OF THE INVENTION

1. Field of the Invention

The present invention relates to a method and apparatus for printing an image in which a printing operation can be changed before the printing operation commences in accordance with predictions as to how much of the printer's resources will be used in printing the image. The image is stored in a coded representation before being converted into a full raster image, the coded representation being susceptible to accurate modeling of resources used in converting to a full raster image. Accordingly, the usage of printer resources in converting the coded representation of the image into a full raster image can be predicted accurately and it can be determined before printing whether the printer has sufficient resources to print the image. In the event that the prediction indicates that there are insufficient resources, resources can be re-allocated so as to permit the image to be printed.

2. Description of the Related Art

Recently, printing apparatus such as laser beam printers which form images by selectively printing pixels on a page have become exceedingly popular because of their flexibility, printing speed and low cost. Such printing apparatuses print images by scanning across a page while selectively printing individual pixels on the scan line. The page is advanced (in printers like laser beam printers the page is advanced continuously while printing) and additional scan lines are formed. The collection of printed pixels from all the scan lines on the page forms the desired image.

Whether pixels are printed on the page, and where those pixels are printed during a scanning operation, are determined by a printer controller which operates in accordance with a stored raster image of the print image. A raster is a computer representation of each of the pixels in the print image, and is stored in bit map memory in the controller. In a bit map memory, there is a one-for-one correspondence between pixels on a printed page and memory locations in the bit map memory.

All printing apparatuses must operate within the constraints of the available resources. For example, the controller, which is typically a microprocessor forming a central processing unit ("CPU"), has only a limited amount of processing power and is able to manipulate only a limited amount of data including image data within any one time period. The controller has access to only a limited amount of memory including the bit map memory. Some printers are provided with other resources such as external memory devices which are accessible through a communication line which has only a limited amount of bandwidth (or data-carrying speed).

Conventional printing apparatuses use the finite amount of resources that are available to them only inefficiently. For example, FIG. 1 is an illustration of a typical CPU resource usage pattern in a printer. As shown in FIG. 1, CPU usage varies widely between peak CPU usage and relatively low CPU usage. Peak CPU usage occurs between printed pages during creation of the raster image in bit map memory while low CPU usage occurs as a page is being printed.

The reason for this inefficiency is that, to ensure that the image is printed properly, printing apparatuses such as laser beam printers which form pixels by scanning must have a full raster image of the print image developed in bit map memory before printing can commence. This is because scanning printing apparatuses print at a uniform rate while a page is being printed. That is, once page printing has begun, printing continues at a uniform rate until page printing ends. Accordingly, to assure that the print engine does not run out of data to print (a condition known as data underflow), the entire image to be printed is developed into a raster image in bit map memory before printing commences. The CPU is responsible for developing the raster image into bit map memory, and this process represents peak CPU usage. During actual printing of the image, however, the CPU needs only to monitor the bit map memory to ensure that the raster image is provided to the print engine at the same rate as the print engine prints it. This relatively simple task represents low CPU usage.

Correspondingly, and as further shown in FIG. 1, when CPU usage is at its maximum, memory usage is at its minimum. This is because bit map memory is full only at a period just prior to image printing. As described above, this corresponds to a period when CPU functions are minimal.

For the simplest print systems, such inefficiencies are tolerable. For example, to print a simple black and white image at low resolution such as 300 dots per inch (dpi) on a standard 8½×11 inch sheet of paper requires approximately 1 megabyte (Mb) of bit map memory. The price of 1 Mb of memory is low enough so that it is acceptable for large portions of the memory to be unused for long periods of time. This remains so even if the bit map memory is double buffered, that is, 2 Mb of memory are provided. Double buffering is desirable because it allows the CPU to develop a succeeding page of image data into a raster image in one buffer at the same time that the CPU is printing a current page of image data from the other buffer. Double buffering helps to provide a continuous stream of raster image data to the print engine thereby obtaining better inter-page throughput in a relatively cost effective manner.

But, as resolution increases, and as greater capabilities (for example, halftone and color) are desired, such inefficiencies can no longer be tolerated. For example, at 600 dpi resolution, four times as much memory is needed than is needed at 300 dpi to store a full raster image. The effect becomes even more pronounced when halftone or color images are considered. For example, to provide sixteen grey levels for each pixel in a halftone image requires 4 bits per pixel. Multiplying four bits per pixel by 4 Mb to store a 600 dpi raster image results in a requirement for a 16 Mb memory to store a halftone raster image. When color is considered, the memory requirements become even greater. For example, to encode four colors per pixel with 8 bits for each color means that 32 bits are required for each pixel. Multiplying 32 bits by 4 Mb for a 600 dpi raster image results in a 128 Mb memory requirement to store a full color 600 dpi raster image. The price for such large amounts of memory is not acceptable for wide commercial acceptance, and becomes even worse when double buffering is provided to reduce inter-page delay.

It has been considered to increase the apparent size of physical memory through the use of virtual memory in which off-line memory devices such as a disk drive are used to provide additional memory space and which are connected to a printer controller through a communication link. The use of virtual memory in a printing apparatus has not proved entirely satisfactory. This is because of the uncertainty involved in ensuring that there is sufficient bandwidth in the communication link so as to provide timely pixel data to the printer engine and avoid data underflow.

SUMMARY

It is an object of the present invention to use resources in a printer more efficiently so as to provide a printer having greater capability without the need of increasing the amount of physical resources available to it.

In one aspect, the invention is a printing apparatus in which an image is stored in a coded, compact representation before it is rendered into a full rasterized image. The representation is such that the resources that are needed to render a full rasterized image can be predicted with great accuracy. Predictor functions are provided to predict resource usage so as to determine, prior to printing, whether the printer has sufficient resources to conduct printing. If sufficient resources are available, then printing is performed. If the resources are not available, trade-offs between resources can be made so as to allow printing to take place.

Because the coded representation allows dynamic and adaptive use of printer resources, the representation is referred hereafter as the dynamic adaptive resource (or resolution) technology, or "DART", representation.

Consider, for example, the resources depicted graphically in FIG. 2, namely, CPU power, memory, and bandwidth. CPU power refers to the speed and ability with which a CPU in a printer controller can manipulate data and process it from one form to another. Memory refers to the amount of memory available to the printer. Bandwidth refers to the bandwidth or data-carrying speed of a communication link to an external memory device. Included in bandwidth are any known delays of the external memory device, for example, access time, disk head delays, and disk rotation speed.

Any one printer will have an envelope of resources available to it defined by a point representing the maximum CPU power, the maximum memory, and the maximum bandwidth. If predictor functions predict that rendering the DART representation into a full raster image will exceed one of these resources, then resource trade-off can be conducted. For example, if it is determined that there is insufficient memory to store the image, but that CPU power is underutilized (represented by point A in FIG. 2), then it is possible to substitute a different DART representation, one which uses less memory but which requires more CPU power to render the representation into a full raster image. Thus, memory has been exchanged for CPU power. This trade-off shifts point A to point A' which is within the resource envelope available to the printer and allows printing to commence.

It is also possible to degrade the image such as by lowering the print resolution or by limiting the number of grey levels for halftone images or colors for color images. Degrading the image eases memory requirements without putting a further burden on the CPU. This trade-off results in a shift of point A to point A" which is within the printer resource envelope and which allows printing to commence.

Conversely, the predictor functions may predict that the CPU has insufficient CPU power to render a full raster image from the DART representation in sufficient time to provide the raster image to the print engine, that is, there would be data underflow. If there is sufficient memory available (represented by point B in FIG. 2), then CPU power may be exchanged for memory space, e.g. by pre-rasterizing the portion of the image that requires too much CPU power. This trade-off shifts point B to point B' which is within the resource envelope of the printing apparatus so that printing may commence.

Likewise, it is also possible to trade-off CPU power and/or memory with bandwidth. For example, in a case like point C in which it is predicted that maximum CPU power is already being expended to render a full raster image from the DART representation, but that memory resources are still exceeded, then it is possible to trade-off memory for bandwidth, e.g. by causing a portion of the image to be stored off-line and retrieved when needed through a communication link. This shifts point C to point C' which is within the resource envelope of the printing apparatus. The predictor functions ensure that the bandwidth is sufficient so that raster image data is timely provided to the print engine and the print engine does not suffer from data underflow.

This brief summary has been provided so that the nature of the invention may be understood quickly. A fuller understanding of the invention may be obtained by reference to the following detailed description in conjunction with the remaining drawings in which:

DETAILED DESCRIPTION OF THE PREFERRED EMBODIMENT

Figure 1:
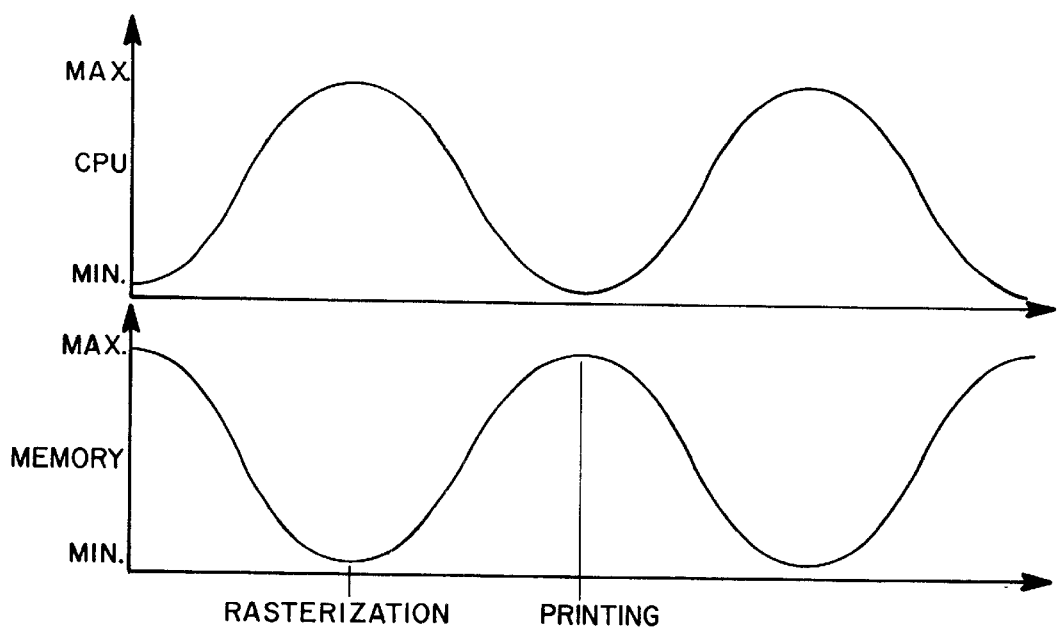
FIG. 1 is a diagram illustrating CPU and memory usage during a print cycle.
Figure 2:
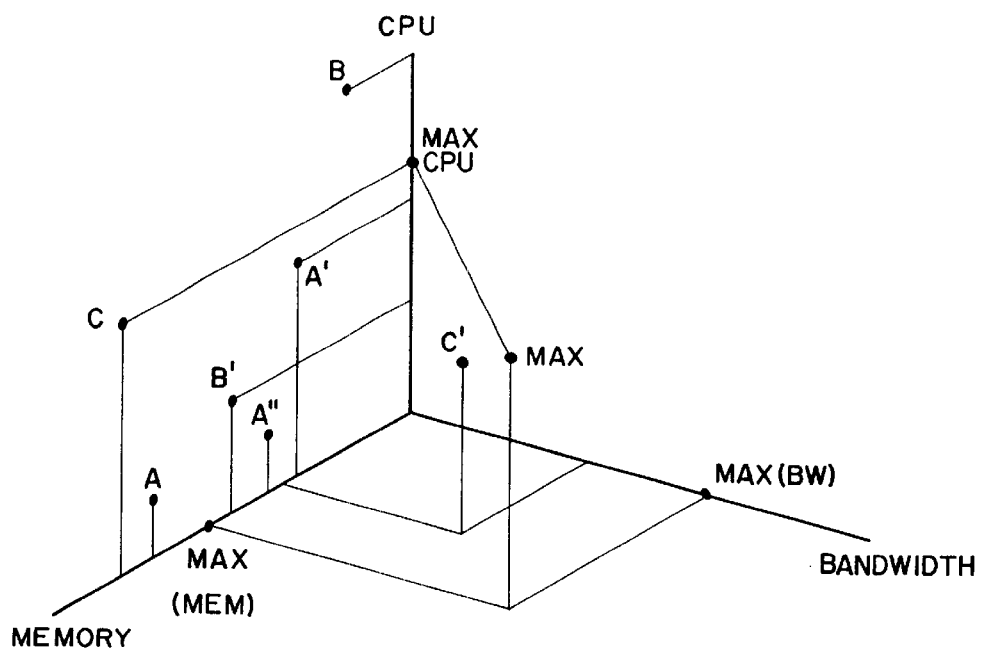
FIG. 2 is a graph used to illustrate the resource envelope available to a printer.
Figure 3:
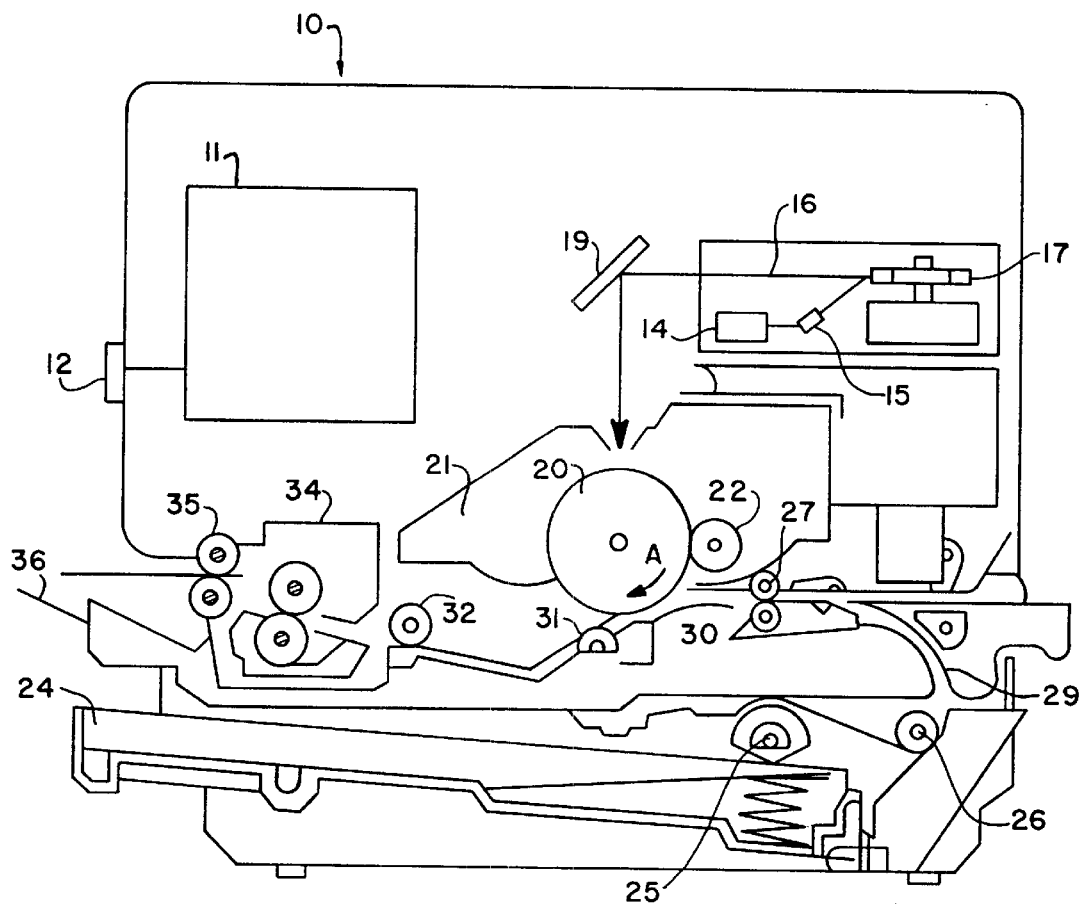
FIG. 3 is a printer according to the invention.

FIG. 3 is a laser beam printing apparatus according to the invention.

As shown in FIG. 3, laser beam printer 10 includes a controller 11 which controls the various mechanical and electrical functions within the printer. In particular, controller 11 accepts image data that is derived by an unshown host computer through communication port 12 and processes the image data so as to derive a laser modulation signal that is applied to laser driver 14. The image data from communication port 12 is preferably in a very compact form such as a page description language ("PDL") which merely defines objects and the objects' location on the page rather than defining a full raster image of the print image. In accordance with the image signal provided by controller 11, laser driver 14 drives laser 15 so as to cause it to emit a laser beam 16. A rotatable polygonal mirror 17 scanningly deflects laser beam 16 via mirror 19 onto the surface of photosensitive drum 20. Photosensitive drum 20 is rotated in the direction of arrow A past charger 21. The scanningly deflected laser beam 16 forms a latent image on the surface of the charged photosensitive drum, and the latent image is developed into a toner image at developer 22.

In coordination with scanning the surface of drum 20, controller 11 causes the topmost sheet of paper from stack 24 to be fed by pickup roller 25 and conveyed by rollers 26 and 27 through image passageway 29 to photosensitive drum 20. The toner-developed latent image on drum 20 is transferred to this sheet by transfer charger 30 and conveyed by rollers 31 and 32 to fixing device 34. In fixing device 34, a combination of heat and pressure fixes the toner image permanently on the sheet and the sheet is ejected by rollers 35 onto output tray 36.

Figure 4:
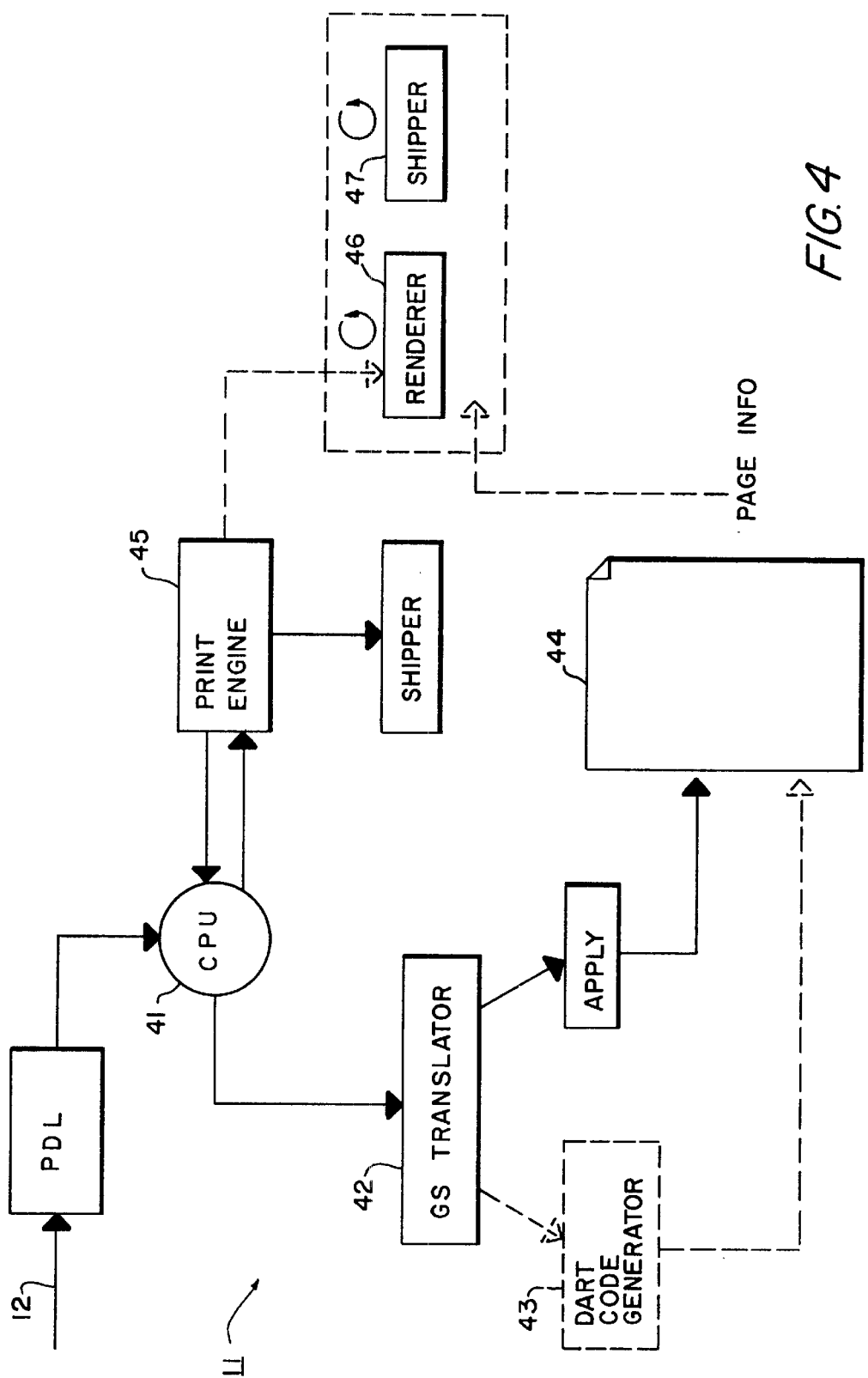
FIG. 4 is a block diagram of a controller for the printer of FIG. 3.

FIG. 4 is a block diagram of controller 11. Each and every physical connection in controller 11 is not depicted in FIG. 4, but rather, FIG. 4 is intended to show the flow of processes within the controller.

As shown in FIG. 4, controller 11 includes CPU 41 which accepts image data such as page description language from communication interface 12. CPU 41 converts page description language image information into a graphics stream language using GS translator 42. Graphics stream (GS) language is a language which encodes image data at a level intermediate the highly compact PDL level and the full raster image data level. As described more fully below, GS language includes primitives, such as image objects, and rules as to how those primitives are applied to bit map memory to form a full raster image.

From the GS representation at 42, CPU 41 generates a DART representation via generator 43. The DART representation created by generator 43 is a compact coded representation for a raster image in which the resources used to convert from the DART representation to a full raster image can be predicted with great accuracy. The DART representation generated by generator 43 uses many of the same primitives as the GS representation. However, unlike GS which acts on a raster image as a whole, the DART representation generated by generator 43 acts only on banded partitions of the image. Accordingly, and because more complex primitives found in the GS representation are not used, accurate predictors of resource usage can be provided for the DART:representation whereas such predictors cannot be provided for GS.

The DART representation generated by generator 43 for each band is stored in memory 44. As printer engine 45 requires data which corresponds to scans of laser beam 16 on photosensitive drum 20, the representation stored in memory 44 is rendered into a full raster image of the band by renderer 46 and shipped by shipper 47 to the printer engine.

Figure 5:
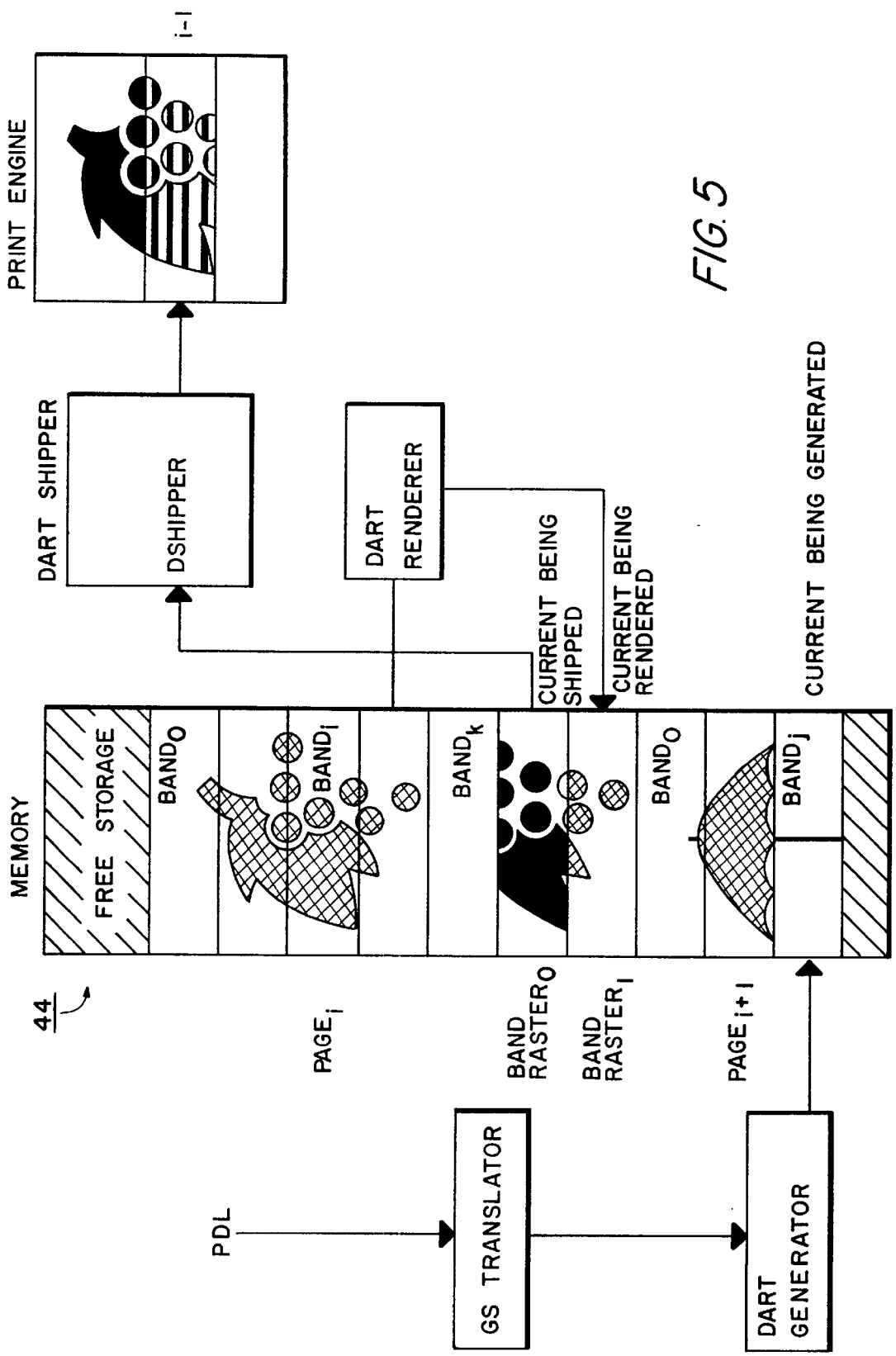
FIG. 5 is a diagram illustrating memory usage in the printer of FIG. 3.

FIG. 5 is a representational view of how an image is partitioned (or banded) in accordance with the DART representation generated by generator 43. As shown in FIG. 5, page images are partitioned into bands that correspond to the scan direction of the print engine, here, the horizontal direction. Typically, about 27 bands are sufficient to process an 8½×11 inch image efficiently, although this many bands have not been shown in FIG. 5 for the sake of simplicity.

Memory 44 is the same memory area that in conventional printers corresponds to the bit map memory. The memory is used as a queue: as DART images are generated the memory is used up and as they are rendered and shipped out to the printer engine the memory is freed. Whenever a new page is to be generated, memory is allocated at the start of free memory. Wrap-around from the end of physical memory to the beginning thereof is provided for. Once all DART objects and applications have been generated for the page, and band raster storage appended to the page, subsequent pages are started at the end of the current page's memory. Once that page has been completely shipped, its band rasters, objects, and page information structure are de-allocated and made available for re-use.

Each of the bands shown in FIG. 5 is processed serially by generator 43. Thus, for example, generator 43 first processes $band_0$ for page i, and stores the DART representation so obtained at the top of memory 44. Generator 43 then processes band, of page i and stores the DART representation so obtained in the next sequential area in memory 44. Processing continues until the last band of page i, corresponding to $band_k$, at which point a DART representation for the entire page is stored in memory 44. At this point, a full rasterized image does not yet exist for page i, but rather only the banded DART representation.

As each band is processed by generator 43, CPU 41 uses predictor functions to ensure that the resources available in printer 10 will not be exceeded when the DART representation stored in memory 44 is rendered into a full raster image. Such predictions are possible because of the structure of the primitives in the DART representation and because of the certainty of the code that renders the full raster image from the DART representation. Assuming that each of the bands can be rendered without exceeding the resources of the printer, CPU 41 appends two blank band rasters (i.e. $band\ raster_0$ and $band\ raster_1$) to the end of page i in memory 44. Each of the blank band rasters is the size of a full bit map image for a single band at the desired print resolution.

Generator 43 then proceeds to generate a banded DART representation for the next page, namely page i+1.

Meanwhile, renderer 46 begins to render the banded DART representations of the page i image into a full raster image on the blank bands. First, renderer 46 renders $band_0$ into $band\ raster_0$. Then, renderer 46 renders the DART representation in band, into a full raster image at band $raster_1$. Meanwhile, while $band_1$ is being rendered, shipper 47 ships the full bit map raster image in band $raster_0$ to print engine 45 so as to output that band. By the time that band $raster_0$ has been shipped to engine 45, renderer 46 has rendered a full raster image for printing $band_1$ in band $raster_1$. The availability of sufficient resources to provide the full raster image in time to avoid print engine data underflow has been guaranteed before printing by the predictor functions.

Shipper 47 then ships the full raster image available in band $raster_1$. Meanwhile, renderer 46 renders a full bit map raster image from the raster representation stored in $band_2$. This process continues until the entire page i has been rendered by renderer 46 and shipped to print engine 45 by shipper 47.

During the period when the DART representation of page i is being rendered into a full raster image and shipped for printing, any free CPU time is being utilized to convert the PDL for the next page, namely, page i+1, into a DART representation in the same manner as described above for page i.

In the above process, if CPU 41 determines, through the use of the predictor functions, that rendering a full raster image from the DART representation will exceed the resources available, then resource trade-off or re-allocation is performed. For example, if it is determined that the DART representation is larger than a full raster image of the print information, indicating that the DART representation is less efficient than a full raster image, then if CPU power is still available, a different and more compact DART representation may be generated by generator 43. Conversely, if it is determined that CPU 41 will not have sufficient power to render a full raster image from the DART representation in the time required to process a band of information, which would result in print engine data underflow, then it is possible to pre-rasterize the offending band (or to pre-rasterize all or some of the page containing the offending band) so that already-rasterized data can be supplied to shipper 47 at the appropriate time.

Figure 6A:
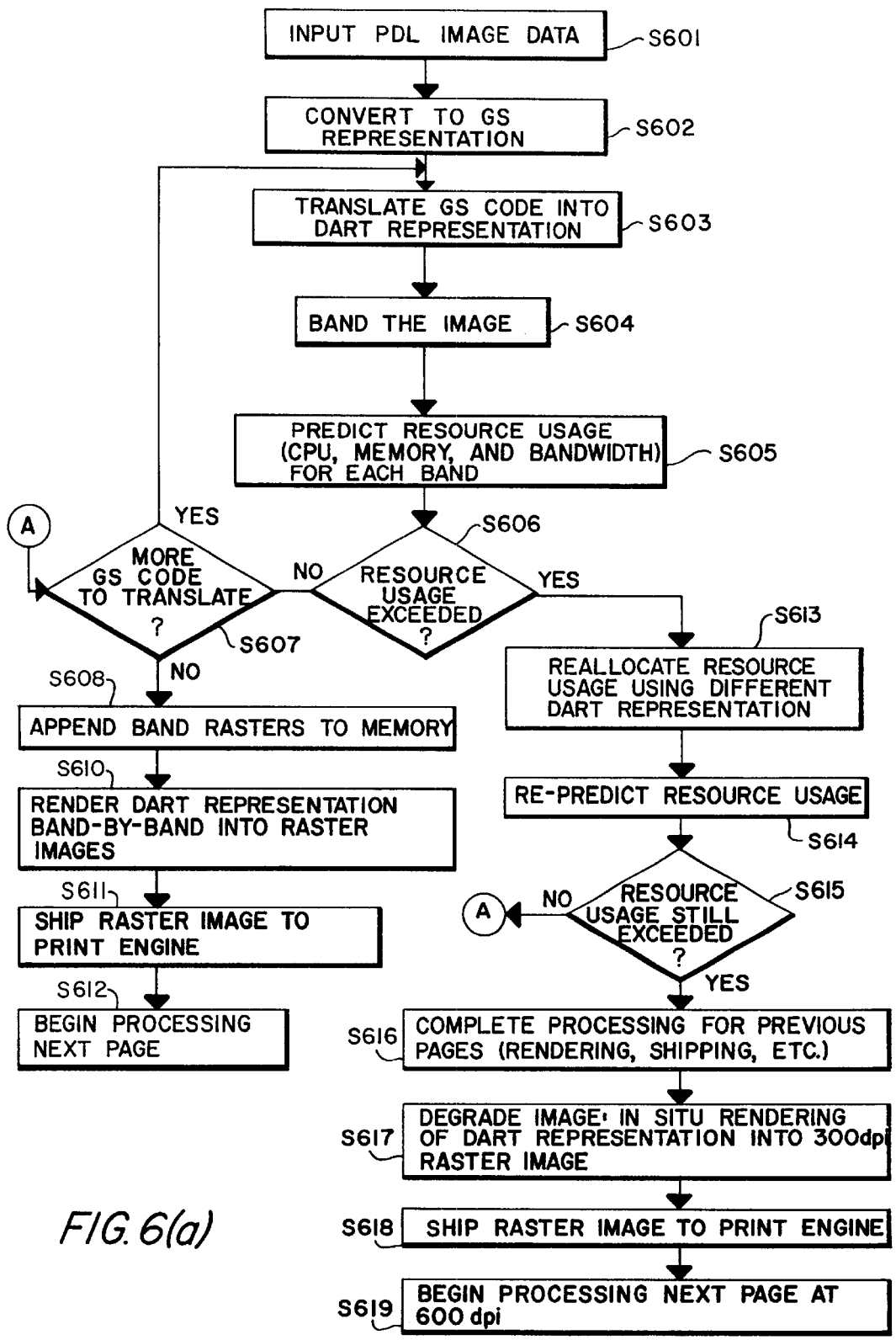
FIGS. 6(a) and 6(b) are flow charts illustrating operation of the FIG. 3 printer.

The overall process is depicted in FIG. 6(a). The process steps in FIG. 6(a) are stored in an unshown memory in controller 11 and are executed by CPU 41.

At step S601, controller 11 inputs image data from communication port 12. The image data is typically generated by an unshown host computer which sends the image data to controller 11 in a compact code such as a page description language.

At step S602, translator 42 translates the PDL image data into GS image data. At step S603, generator 42 generates a DART representation from the GS data and stores it in memory 44. As the DART representation is generated, it is banded in step S604, and in step S605 CPU 41 maintains a running tally of resource usage that will be required in rendering the DART representation into a full raster image. Specifically, for each of the different DART representations, predictors are provided that predict (a) CPU power required to render the DART representation, and (b) memory required to store the DART representation. If printer 10 were equipped with external memory linked to CPU 41 via a bandwidth-limited communication line, then a third predictor would be provided as to the bandwidth requirements for each DART representation.

The resources described here, namely CPU power, memory and bandwidth, are representative of the types of resources that printer 10 may be provided with. For each additional resource, corresponding predictor functions are likewise provided and used by CPU 41 to tally resource usage.

In step S606, CPU 41 determines, based on the tally from the predictor functions, whether resource usage will be exceeded in rendering the DART representation for the current band in a full raster image in the band rasters. Step S606 may be executed periodically during DART generation, e.g. after each DART representation is generated, or it may be executed after the DART representation for the full band is generated. In the case of determining whether memory usage is exceeded by the DART representation, it is preferred to execute step S606 periodically, for example, every time a new DART object is created.

If in step S606 CPU 41 determines that resource requirements to render the current band can be met, then flow advances to step S607 where CPU 41 determines whether there is additional GS code for the current page. If there is more GS code for the page, then flow returns to step S603 until the remaining image data has been processed.

When DART representations for all bands in the page have been generated, flow advances from step S607 to step S608 where a pair of blank band rasters are appended to the DART representation stored in memory 44. If flow has advanced to this step, then it is known that the resources available in the printer are adequate to render the DART representation band-by-band into a full raster image without the danger of exceeding printer resources, e.g. there is enough CPU power to avoid data underflow to the print engine.

In step S610, the DART representations are rendered band-by-band into alternating ones of the pair of band rasters, as described above in connection with FIG. 5. Then in step S611, shipper 47 ships the raster image to print engine 45. Steps S610 and S611 are executed concurrently and sequentially so that, as described in connection with FIG. 5, as shipper 47 finishes shipping one band of raster image from one band raster, renderer 46 has completed rendering the next band of DART representation into the other band raster.

It is also possible to provide more than two blank band rasters, in which case renderer 46 completes rendering of a fixed number of bands ahead of shipper 47.

After the current page has been printed, or as CPU time permits during rendering and shipping in steps S610 and S611, CPU 41 begins processing the next page (step S612) in accordance with the overall flow shown in FIG. 6(a).

If in step S606 CPU 41 determines that there are insufficient resources available in the printer, it is known that the resources needed to render or store the current DART representation exceed the resource envelope of the printer. Flow then advances to step S613 where CPU 41 performs resource trade-off or re-allocation in an attempt to fit the DART representation into the printer resource envelope. Initially, a different DART representation is selected for the offending band. For example, if the memory resource has been exceeded, then a memory-intensive DART representation may be replaced by a different representation which uses comparatively less memory. Likewise, if the CPU resource has been exceeded, then a CPU-intensive DART representation may be replaced by a different representation which uses comparatively less CPU. For example, the offending band may be pre-rasterized and stored in memory 45 so that it is ready for printing by the print engine without any further CPU processing.

In step S614, resource usage with the different DART representations is re-predicted. If resource usage now falls within the resource envelope then flow proceeds to step S607 and continues as described above. If resource usage is still exceeded, then further attempts may be made to bring resource usage within the printer envelope (steps S613 and S614).

Alternatively, or in the case where it is not possible for the DART representation to be brought within the resource envelope, then the image is degraded prior to printing. Degrading automatically reduces resource requirements. In the example given here, the image is degraded by reducing the resolution (or pixel density) from 600 dpi to 300 dpi. Image degradation may take other forms: for a halftone image, degradation may also include reducing the number of grey levels; for a color image, degradation may also include reducing the number of colors.

In step S616, in preparation for resolution degradation, processing is completed for all previous pages in memory 45, that is, DART representations for prior pages are rendered and shipped as shown at steps S610 and S611.

In step S617, image resolution is degraded by rendering the DART representations that have already been generated by generator 43. The DART representations are rendered in situ in memory 45 but at the degraded resolution. Then, GS that has not already been processed is converted to a degraded raster image in memory 45. The conversion is either direct into the degraded raster image or indirectly by first generating a DART representation and then rendering.

In step S618, shipper 47 ships the degraded raster image to the print engine. Preferably, when degradation is necessary, it should be complemented with some form of image enhancement so as to minimize the effects of degradation. For example, in the case of resolution degradation, smoothing circuitry such as that described in U.S. Pat. No. 4,878,068 may be employed at the time the degraded image is shipped so as to soften the appearance of the printed degraded image.

In step S619, processing for the next page begins but without degradation.

Steps S613 through S619 provide repetitive attempts to reallocate resource usage so that sufficient resources are available for the DART representation. In its simplest form of resource trade-off, however, and in the embodiment presently preferred, resource trade-off takes the form of immediate image degradation when it is determined that resources have been exceeded, whereby the color, grey scale or pixel density (or resolution) is degraded. In the case of a simple black and white image which is being rendered into a 600 dpi raster image, for example, resolution can be degraded to 300 dpi and a full raster image can be stored in memory 45. In this instance, the DART representation is converted in situ into a degraded-but-full raster image of the image data, whereupon the full raster image is shipped via shipper 47 to print engine 45. If desired, image smoothing techniques can be applied, such as those described in U.S. Pat. No. 4,878,068, so as to improve the appearance of the lower resolution image.

Figure 6B:
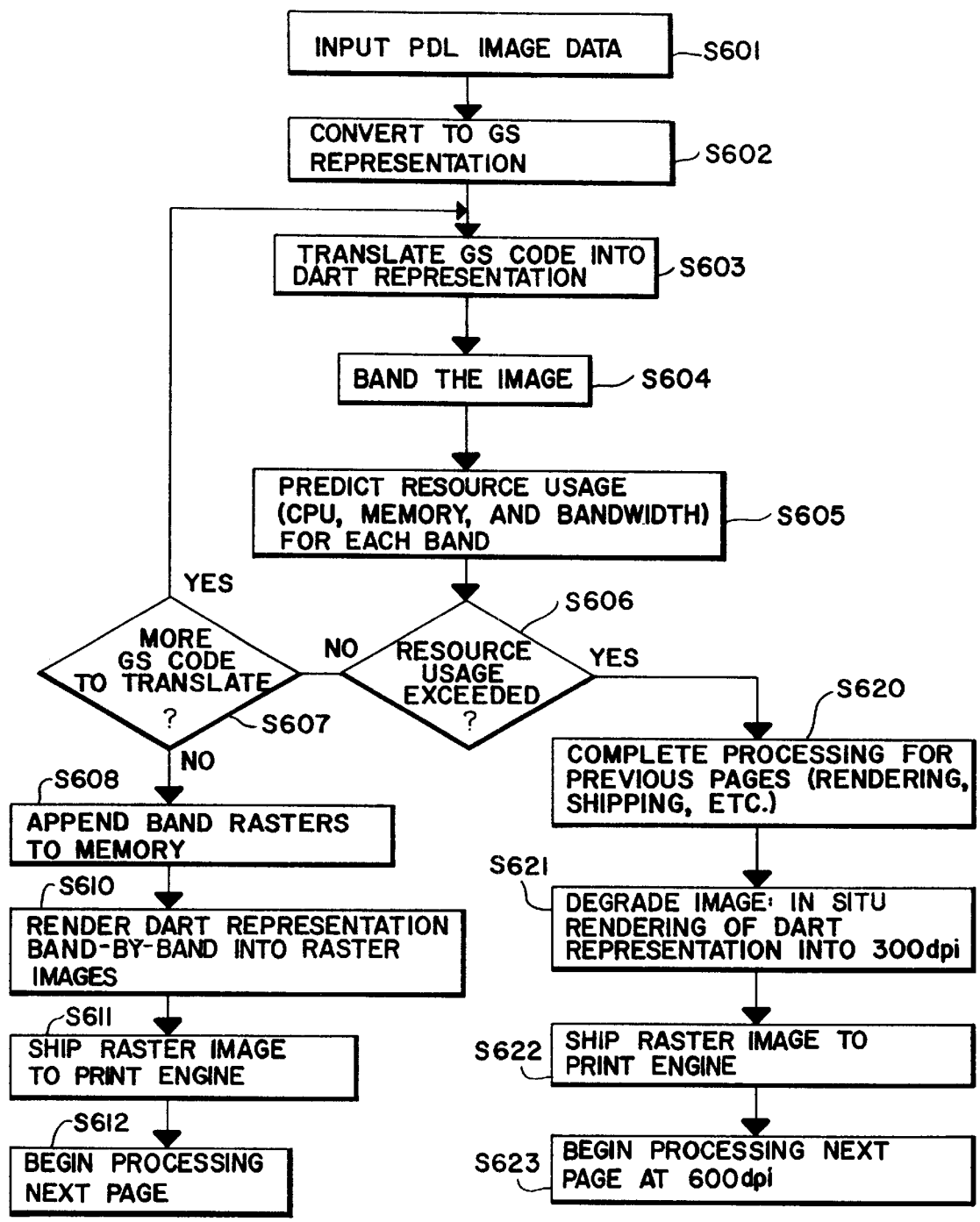

FIG. 6(b) shows this process. In FIG. 6(b), steps S601 to S604 are the same as in FIG. 6(a) and a description thereof is omitted.

In step S605 CPU 41 maintains a running tally of resource usage that will be required in rendering the DART representation into a full raster image.. As in the FIG. 6(a) embodiment, for each of the different DART representations, predictors are provided to predict CPU power, memory usage, bandwidth, and so on. In addition, so as to ensure that there is sufficient memory to rasterize a degraded image in bit map memory (if degradation is needed), a running tally is maintained of the memory that will be required to rasterize a full bit map image at the degraded resolution.

Steps S607 through S608 are the same as in FIG. 6(a) and their description is omitted.

In step S606, if it is determined that resource usage has been exceeded, or if it is determined that the memory required to rasterize a full bit map image at the degraded resolution exceeds available memory, then the image is immediately degraded so as to bring resource usage within the printer resource envelope. Image degradation is performed in steps S620, S621, S622 and S623, which are the same as steps S616, S617, S618 and S619 in FIG. 6(a), respectively.

The various DART representations of the image that are currently preferred, and the predictor functions associated with these representation, are given as follows.

The primitives used for the representation are objects and backgrounds. The DART representation comprises a series of applications of various ones of these objects to various ones of the backgrounds.

A background consists of either a bit map tile or an image. Bit map tiles are derived from the GS image representation from translator 42. Color may be mapped onto a bit map tile by mapping colors into color planes of corresponding tiles. An image is an image representation and is optimized for fast rendering and prediction.

The object primitives that are utilized in the raster representation are preferred because their renderings into full raster images can be predicted with certainty and with accuracy. The preferred set of object primitives include bit maps, run length sequences, trapezoid sequences, boxes and fast boundary encoded bit maps. Each of these. objects is defined with greater specificity below.

Figure 7:
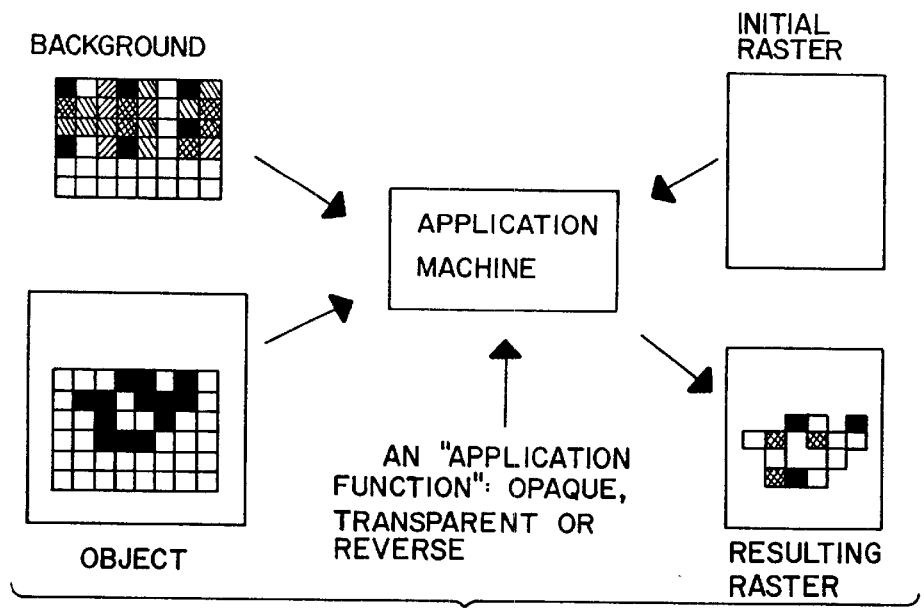
FIG. 7 depicts coded image representations according to the invention.

A single application of a DART-encoded image representation to a fully rasterized bit map memory is depicted in FIG. 7. There, a background function defined by a tile or an image is provided to an application machine. An object such as a bit map, run length, trapezoid, box or fixed boundary encoded map is also provided to the application machine. The application machine applies the object onto the background at a specified area in the bit map for the band under consideration so as to convert the initial raster in the bit map into the resulting raster shown in FIG. 7.

Different rendering functions are used for different DART objects, and each rendering function is tailored to render its associated DART object as efficiently as possible. Preferably, the rendering functions are optimized for the speed on the controller's CPU and for the code compactness. Suitable rendering functions are described by Foley, van Dam, Feiner and Hughes in "Computer Graphics: Principles and Practice" (2nd Edition), published in 1987 by Addison-Wesley Publishing Company.

Predictors for the DART representation predict both the memory required to store the DART representation as well as the time (or CPU power) needed to render the DART representation. In general, the memory required to store the DART representation while rendering the i-th band in an image is $$MemoryRequired_i = \sum_{i \leq k \leq n} BandSize_k + 2 \times BandRasterSize$$

where $BandSize_k$ is the amount of memory that will be freed after the k-th band is rendered, BandRasterSize is the size of the fully rasterized band rasters appended to the end of page memory, and n is the number of currently-stored bands of DART objects. CPU 41 ensures that this memory requirement does not exceed available memory. In embodiments like those shown at FIG. 6(b), where images are rendered at degraded resolution when there are insufficient resources available for printing at higher resolution, CPU 41 also ensures that memory requirements do not exceed what is needed to render the image at the degraded resolution, namely:

$$DegradedMemRequired_i = \sum_{i \leq k \leq n} BandSize_k + (i+1) \times BandRasterSizeDegraded$$

where BandRasterSizeDegraded is the size of band rasters at the degraded resolution.

As for predictors of the time (or CPU power) needed to render the DART representation, since rendering involves the generation of both objects and backgrounds, as well as the application of the objects and backgrounds to the raster, the time required to render is dependent on the sum of the times for these functions. The predictor functions reflect this dependency. In practice, an overhead factor is also added to accommodate system overhead processes in the rendering process.

Detailed descriptions of the objects and their associated predictor functions follow. In general, however, predictor functions for CPU power all have the form Time=(ApplicationTime+BackgroundTime)×OverheadFactor where ApplicationTime is the time needed to apply the DART object, BackgroundTime is the time needed to expand the background, and OverheadFactor is the aforementioned overhead factor to accommodate system overhead processes. BackgroundTime depends on the area of the background that is expanded for rendering and is also dependent on the type of background and its expansion algorithm.

A bit map object, as its name implies, is simply a bit map raster image of an object. Thus, as shown in FIG. 8, the object 71 includes an identification label followed by a bit map rasterized image of the object 71.

Figure 8:
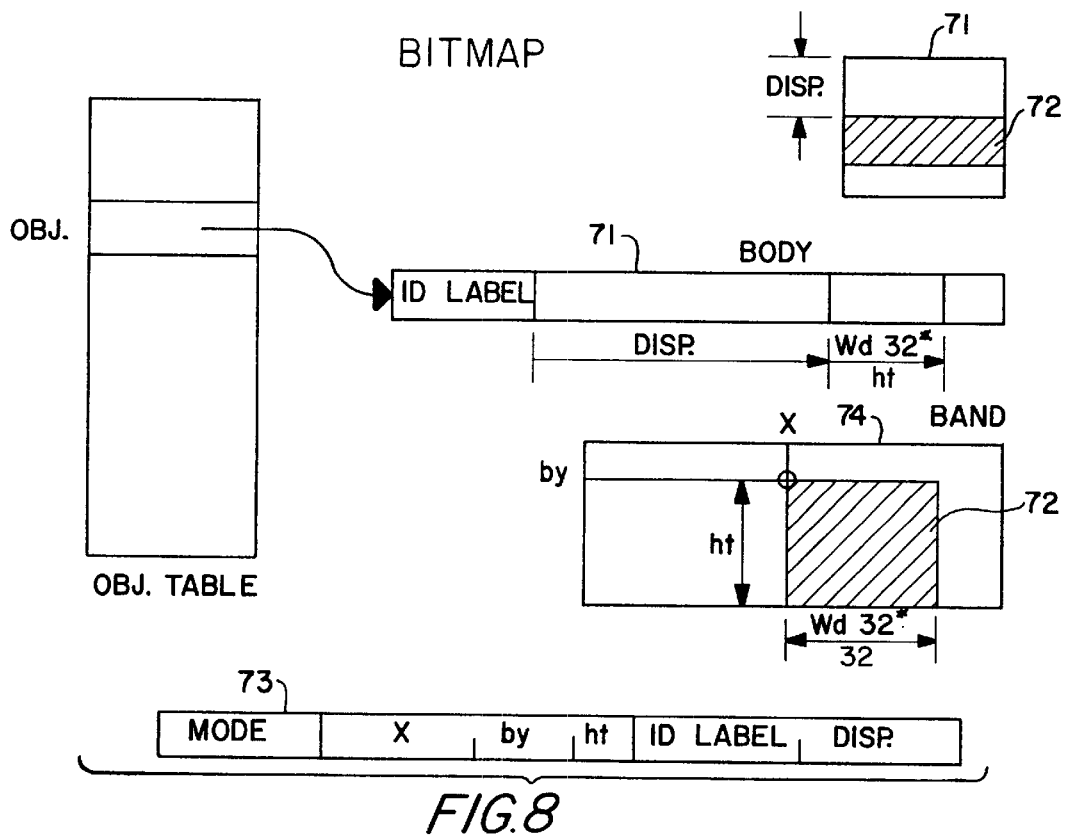
FIGS. 8 to 12 depict object images shown in FIG. 7.

The application of a portion 72 of the bit map object into a band is also depicted in FIG. 8. As shown there, the object is to be applied on the band beginning at a displacement disp from the beginning of the object and is to be applied at a position by, x and for a height ht within the band. The application is shown at 73 and includes a mode definition which defines the background over which the object is to be applied, as well as the bx and by coordinates within the band at which the object is to be applied, and the height ht over which the object is to be applied. The ID label for the object is specified and the displacement within the object is included.

The predictor function for the CPU power needed to render a bit map application is $$Time_{BitMap} = (N_1 \times ht + Background) \times OverheadFactor$$

where $N_1$ is an implementation factor related to the number of CPU cycles needed to apply each row of the bit map object.

Figure 9:
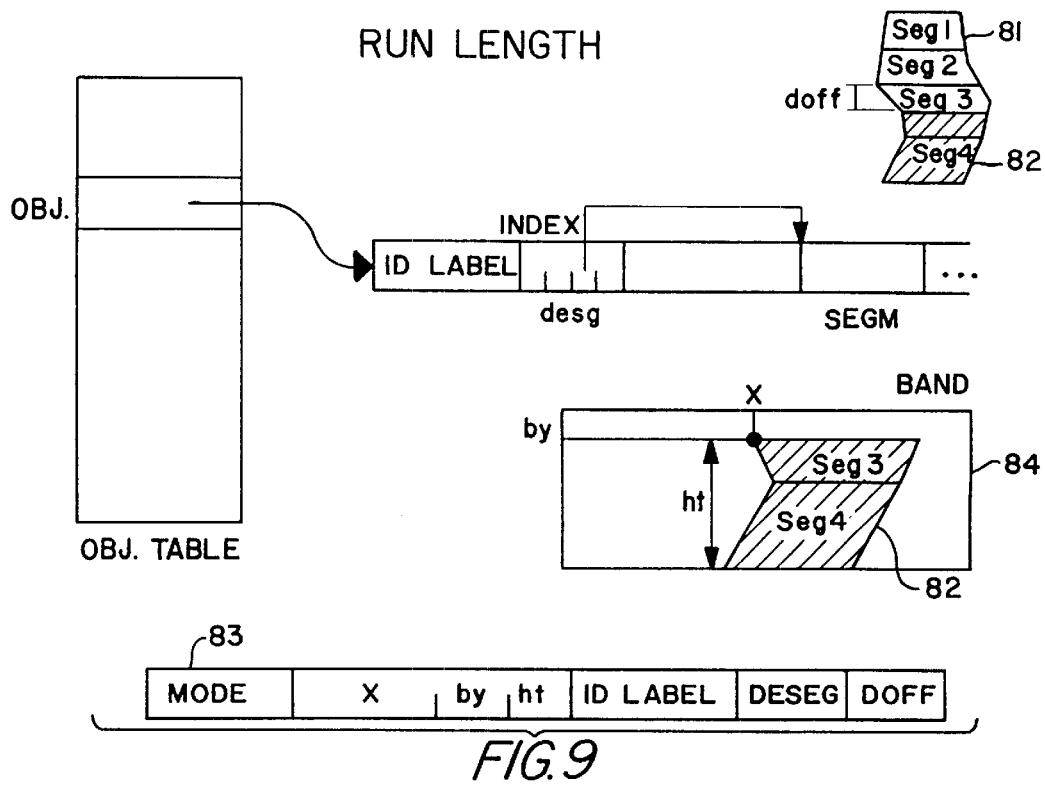

Run length objects are depicted in FIG. 9. Run length objects are segmented, each segment describing successive scan lines and each scan line consisting of a single run length. Thus, as shown in FIG. 9, run length object 81 includes segments 1 through segments 4.

The DART representation of a run length object is shown at 82. The object includes an ID label and a segment index which contains information about the segment rendering time estimation. This information is used by the predictor function. Each segment contains the description of up to a predetermined number of run lengths and each segment is aligned to byte boundaries.

A segment defines successive run lengths in a differential manner, by modifying the segment state while stepping through. The segment state consists of two pairs of contour states (left and right). Each contour consists of a position x and an increment dx.

At the beginning of the segment:

$$xl_0 = dxl_0 = xr_0 = dxr_0 = 0$$

For each scan line i the segment defines an advance step of the form: $step_i = <advl_i, advr_i>$, that is used as follows:

$$dxl_i = dxl_{i-1} + advl_i$$

$$dxr_i = dxr_{i-1} + advr_i$$

$$xl_i = xl_{i-1} + dxl_i$$

$$xr_i = xr_{i-1} + dxr_i$$

The application of a portion 83 of a run length object 81 in a band 84 is also shown in FIG. 9. There, portion 83 of the run length object 81 is applied at position by, x within band 84 and continues for a height ht. The coded representation for this application is shown at 83 and includes a mode which defines the type of background over which the run length object is applied. X, by and ht coordinate information is provided, as well as an ID label, the segment from the segment index, and the offset from the beginning of the segment.

The predictor function for the CPU power needed to render a run length object is $$Time_{RunLength} = (N_2 \times ht + N_3 \times area + Background) \times OverheadFactor$$

where the parameters $N_2$ and $N_3$ are similar to those for bit map objects.

Figure 10:
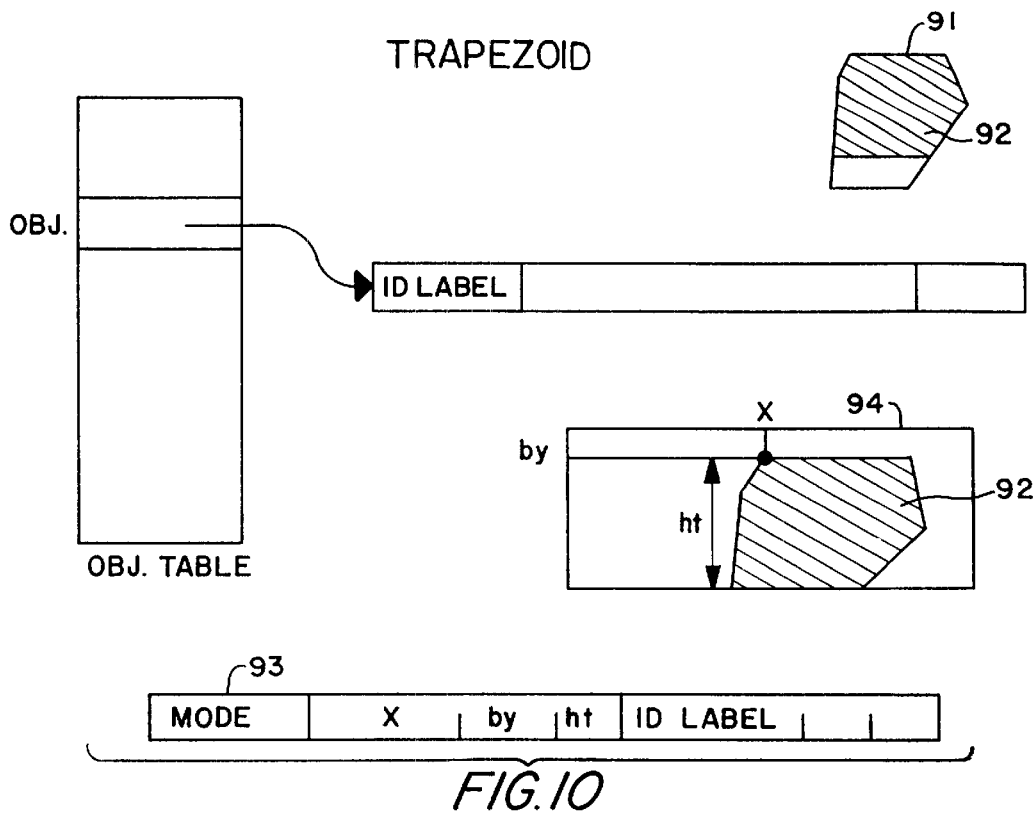

FIG. 10 depicts trapezoid objects. Trapezoid objects are not segmented, in contrast with run length objects. This is because it is assumed that trapezoid sequences are usually not intended to be reused (they describe large areas of the raster).

Each object describes successive scan lines, with each scan line consisting of a single run length.

A trapezoid sequence defines successive run lengths with a DDA algorithm. The state consists of two pairs of contour states (left and right). Each contour state consists of a position x and a slope.

At the beginning of the trapezoid sequence:

$$xl = slopel = xr = sloper = 0$$

The object consists of a sequence of actions. These actions are either modify or paint. A modify action is a pair:

$$modify = <modx, modslope>$$

which affects the state x+=modx;

slope+=modslope;

A paint action defines a number count of run lengths by iterating the following steps count times:

xl+=slopel;

xr++sloper;

y++;

IssueRunLength (xl, xr, y);

A paint action with count zero denotes the end of the trapezoid sequence.

FIG. 10 also shows the application of a portion 93 of a trapezoid object into a band 94. As shown there, portion 93 is applied to band 94 at position by, x and continuing for a height ht in the band. The application is shown at 93, and includes a mode which defines the background against which the object is applied, as well as the x, by and ht coordinates within the band. The ID label for the object is provided. No additional information is needed because trapezoidal objects are not segmented and the entire trapezoid is applied for the distance ht.

The predictor function for the CPU power needed to render a trapezoid application is $$Time_{Trapezoid} = (N_4 \times ht + N_5 \times area + Background) \times OverheadFactor$$

where $N_4$ and $N_5$ are parameters similar to those for bit map objects.

Figure 11:
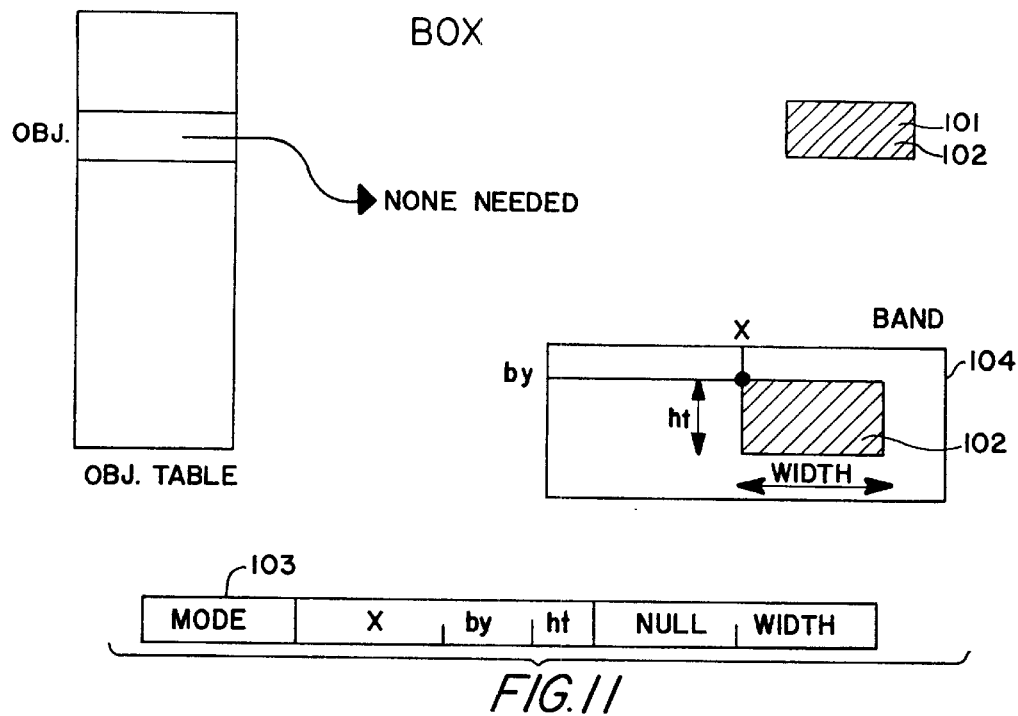

Box objects are depicted in FIG. 11. Rectangular boxes are such a common object that they merit their own optimized representation. In this case there is no need to have an object per se, since the application defines the box, as shown in the figure.

The application of a box object to a band 104 is also depicted in FIG. 11. As shown there, the box object is applied at position by, x and continues for a height ht and a width w in the band. The application is defined by 103 which includes a mode word which defines the background against which the box is applied, and includes. coordinates x, by, and ht for the application. A null word is provided followed by the width of the box.

The predictor function for the CPU power needed to render a box object is $$Time_{Box} = N_6 \times ht \times w + Background) \times OverheadFactor$$

where $N_6$ is a parameter similar to those for bit map objects.

Figure 12:
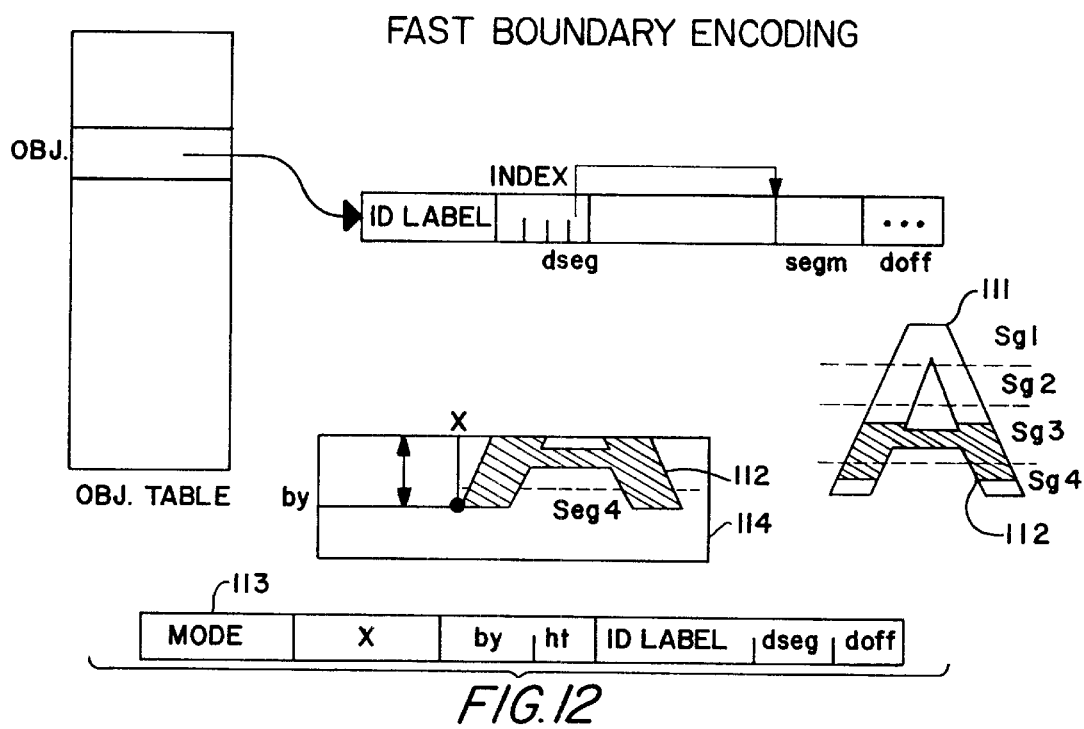

Fast boundary encoded (FBE) objects are depicted in FIG. 12. An FBE segment describes successive scan lines, and each scan line consists of multiple run lengths.

Again, the segment index contains information (dt-fbePred-t record) about the segment rendering time estimation, used by the predictor functions. This information is larger than the one used for run length objects.

A segment defines successive run lengths in a differential manner, by modifying the segment state while stepping through.

The segment state consists of multiple contour states. Each contour consists of a position x and an increment dx.

At the beginning of the segment:

$x[k]=dx[k]=0$ for all values of k.

The segment consists of a series of commands, chosen among the following:

adv: advance corresponding contour as in the case of RLSeqs.

close: delete the next two contours.

open: insert two new contours between the current contour and the next one.

For each scan line i the segment defines an advance step of the form step$_i$=<linechange, comm$_1$, comm$_2$ . . . , comm$_n$>that is used to transform the segment state. Linechange specifies the change (increase or decrease) of the number of pairs of contours with respect to the previous scan line, or a reset at segment boundaries. The execution of comm$_1$, comm$_2$, . . . , comm$_n$ brings the number of contours in accordance to linechange. A linechange that makes the number of contour pairs negative denotes the end of the segment.

FIG. 12 also shows how a portion 112 of FBE object 111 is applied to band 114. As shown in FIG. 12 the portion 112 is applied to the band at position by, x, for a height ht beginning at an offset doff from the beginning of segment 3.

The application is defined at 113 which includes a mode word for defining the background against which the FBE object is applied. 113 further includes the x, by and ht coordinates of the application, as well as the ID label for the object, the segment that is to be applied, and the offset from the beginning of the segment.

The predictor function for the CPU power needed to render an FBE application is the sum of the CPU power needed for each segment, where the CPU power for each segment is dependent on the number of run lengths that need to be rendered and the height of the segment.

What is claimed is:

1. A printing apparatus comprising:

a print engine for scanningly forming a print image at a uniform rate;

translation means for translating input print data into a coded representation of the print image;

predicting means for predicting usage of plural resources of the printing apparatus in rendering the coded representation to a first raster image, said predicting means predicting on the basis of the coded representation of the print image and on the basis of the plural resources; and rendering means for rendering the coded representation into the first raster image or a second raster image, said second raster image being degraded in a number of halftone gray levels, wherein said rendering means renders the coded representation into the second raster image in the case where said predicting means predicts that there are insufficient resources to render the coded representation into the first raster image.

2. A printing apparatus according to claim 1, wherein said predicting means predicts at least computing power requirements and memory requirements for rendering the coded representation into the first raster image.

3. A printing apparatus according to claim 1, further comprising input means for inputting the print data that is translated by said translation means.

4. A printing apparatus according to claim 3, wherein the print data is inputted in a page description language.

5. A printing apparatus according to claim 1, further comprising a memory having a first portion adapted to store coded representations in bands, and a second portion adapted to store the first raster image or the second raster image of corresponding bands of information.

6. A printing apparatus according to claim 5, wherein said translation means translates the input print data in bands.

7. A printing apparatus according to claim 6, wherein said predicting means predicts resource usage for each band of print information.

8. A printing apparatus according to claim 7, wherein in the case where said predicting means predicts that there are insufficient resources, said rendering means renders the second raster image in situ in the first and the second portions of said memory.

9. A printing apparatus according to claim 1, wherein said translation means translates input information into bands of coded representations, said apparatus further comprising determining means for determining whether a band for which there is insufficient computing power to render in a predetermined period of time corresponding to the uniform rate of said print engine is pre-rasterized by said rendering means.

10. A printing apparatus according to claim 1, wherein said predicting means predicts whether the coded representation consumes more memory than a corresponding raster image.

11. A printing apparatus according to claim 1, wherein said predicting means predicts whether there are insufficient resources available for rendering one band of information.

12. A printing apparatus according to claim 1, wherein said representation comprises at least one of a bit map object, a run length object, a trapezoid object, a box object, and a fixed boundary encoding object.

13. A printing apparatus according to claim 12, wherein said rendering means includes means for applying an object against a background with an application function so as to achieve a rasterization of the representation.

14. A printing apparatus according to claim 1, wherein the raster image rendered by said rendering means is for an entire page.

15. A printing method for a printer comprising the steps of:

translating input print data into a coded representation of a print image;

predicting usage of plural resources of the printer in rendering the coded representation into a first raster image, said predicting being made on the basis of the coded representation of the print image and on the basis of the plural resources;

rendering the coded representation into the first raster image or a second raster image, said second raster image being degraded in a number of halftone gray levels, wherein said rendering step renders the coded representation into the second raster image in the case where said predicting step predicts that there are insufficient resources to render the coded representation into the first raster image; and scanningly printing the raster image in said rendering step on the printer at a uniform rate.

16. A printing method according to claim 15, wherein said predicting step predicts at least computing power requirements and memory requirements for rendering the coded representation into the first raster image.

17. A printing method according to claim 15, further comprising the step of inputting the input print data that is translated in said translating step.

18. A printing method according to claim 17, wherein the input print data is inputted in a page description language.

19. A printing method according to claim 15, further comprising the steps of storing coded representations in bands in a first portion of a memory, and storing the first raster image or the second raster image of corresponding bands of information in a second portion of said memory.

20. A printing method according to claim 19, wherein said translating step translates the input print data in bands.

21. A printing method according to claim 20, wherein said predicting step predicts resource usage for each band of print information.

22. A printing method according to claim 21, wherein in the case where said predicting step predicts that there are insufficient resources, said rendering step renders the second raster image in situ in the first and the second portions of said memory.

23. A printing method according to claim 15, wherein said translating step translates input information into bands of coded representations, and wherein said method further comprises the steps of determining whether a band for which there is insufficient computing power to render in a predetermined period of time corresponding to the uniform rate of said print engine is pre-rasterized in said rendering step.

24. A printing method according to claim 15, wherein said predicting step predicts whether the coded representation consumes more memory than a corresponding raster image.

25. A printing method according to claim 15, wherein said predicting step predicts whether there are insufficient resources available for rendering one band of information.

26. A printing method according to claim 15, wherein said representation comprises at least one of a bit map object, a run length object, a trapezoid object, a box object, and a fixed boundary encoding object.

27. A printing method according to claim 26, wherein said rendering step includes the step of applying an object against a background with an application function so as to achieve a rasterization of the representation.

28. A printing method according to claim 15, wherein the raster image rendered in said rendering step is for an entire page.

29. Computer-executable process steps stored on a computer-readable medium, the process steps for printing a raster image on a printer, the computer-executable process steps comprising:
   a translating step to translate input print data into a coded representation of a print image;
   a predicting step to predict usage of plural resources of the printer in rendering the stored coded representation into a first raster image, said predicting step predicting on the basis of the coded representation of the print image and on the basis of the plural resources;
   a rendering step to render the coded representation into the first raster image or a second raster image, said second raster image being degraded in a number of halftone gray levels, wherein said rendering step renders the coded representation into the second raster image in the case where said predicting step predicts that there are insufficient resources to render the coded representation into the first raster image; and
   a printing step to scanningly print the raster image on the printer at a uniform rate.

30. Computer-executable process steps according to claim 29, wherein said predicting step predicts at least computing power requirements and memory requirements for rendering the coded representation into the first raster image.

31. Computer-executable process steps according to claim 29, further comprising an inputting step to input the input print data that is translated in said translating step.

32. Computer-executable process steps according to claim 31, wherein the input print data is inputted in a page description language.

33. Computer-executable process steps according to claim 29, further comprising the steps of storing coded representations in bands in a first portion of a memory, and storing the first raster image or the second raster image of corresponding bands of information in a second portion of said memory.

34. Computer-executable process steps according to claim 33, wherein said translating step translates the input print data in bands.

35. Computer-executable process steps according to claim 34, wherein said predicting step predicts resource usage for each band of print information.

36. Computer-executable process steps according to claim 35, wherein in the case where said predicting step predicts that there are insufficient resources, said rendering step renders the second raster image in situ in the first and the second portions of said memory.

37. Computer-executable process steps according to claim 29, wherein said translating step translates input information into bands of coded representations, said process steps further comprising a determining step to determine whether a band for which there is insufficient computing power to render in a predetermined period of time corresponding to the uniform rate of said print engine is pre-rasterized in said rendering step.

38. Computer-executable process steps according to claim 29, wherein said predicting step predicts whether the coded representation consumes more memory than a corresponding raster image.

39. Computer-executable process steps according to claim 29, wherein said predicting step predicts whether there are insufficient resources available for rendering one band of information.

40. Computer-executable process steps according to claim 29, wherein said representation comprises at least one of a bit map object, a run length object, a trapezoid object, a box object, and a fixed boundary encoding object.

41. Computer-executable process steps according to claim 40, wherein said rendering step includes the step of applying an object against a background with an application function so as to achieve a rasterization of the representation.

42. Computer-executable process steps according to claim 29, wherein the raster image rendered in said rendering step is for an entire page.

43. A computer-readable memory medium for storing computer-executable process steps for printing a raster image on a printer, the computer-executable process steps comprising:
   a translating step to translate input print data into a coded representation of a print image;
   a predicting step to predict usage of plural resources of the printer in rendering the coded representation into a first raster image, said predicting step predicting on the basis of the coded representation of the print image and on the basis of the plural resources;

a rendering step to render the coded representation into the first raster image or a second raster image, said second raster image bring degraded in a number of halftone gray levels, wherein sad rendering step renders the coded representation into the second raster image in the case where said predicting step predicts that there are insufficient resources to render the coded representation into the fist raster image; and a printing step to scanningly print the raster image on the printer at a uniform rate.

44. A computer-readable medium according to claim 43, wherein said predicting step predicts at least computing power requirements and memory requirements for rendering the coded representation into the first raster image.

45. A computer-readable medium according to claim 43, further comprising an inputting step to input the input print data that is translated in said translating step.

46. A computer-readable medium according to claim 45, wherein the input print data is inputted in a page description language.

47. A computer-readable medium according to claim 43, further comprising the steps of storing coded representations in bands in a first portion of a memory, and storing the first raster image or the second raster image of corresponding bands of information in a second portion of said memory.

48. A computer-readable medium according to claim 47, wherein said translating step translates the input print data in bands.

49. A computer-readable medium according to claim 48, wherein said predicting step predicts resource usage for each band of print information.

50. A computer-readable medium according to claim 49, wherein in the case where said predicting step predicts that there are insufficient resources, said rendering step renders the second raster image in situ in the first and the second portions of said memory.

51. A computer-readable medium according to claim 43, wherein said translating step translates input information into bands of coded representations, said computer-executable process steps further comprising a determining step to determine whether a band for which there is insufficient computing power to render in a predetermined period of time corresponding to the uniform rate of said print engine is pre-rasterized in said rendering step.

52. A computer-readable medium according to claim 43, wherein said predicting step predicts whether the coded representation consumes more memory than a corresponding raster image.

53. A computer-readable medium according to claim 43, wherein said predicting step predicts whether there are insufficient resources available for rendering one band of information.

54. A computer-readable medium according to claim 43, wherein said representation comprises at least one of a bit map object, a run length object, a trapezoid object, a box object, and a fixed boundary encoding object.

55. A computer-readable medium according to claim 54, wherein said rendering step includes the step of applying an object against a background with an application function so as to achieve a rasterization of the representation.

56. A computer-readable medium according to claim 43, wherein the raster image rendered in said rendering step is for an entire page.

\* \* \* \* \*

UNITED STATES PATENT AND TRADEMARK OFFICE
CERTIFICATE OF CORRECTION

PATENT NO. : 6,456,387 B1  
DATED : September 24, 2002  
INVENTOR(S) : Luis Trabb Pardo et al.

It is certified that error appears in the above-identified patent and that said Letters Patent is hereby corrected as shown below:

Column 4,  
Line 36, "EMBODIMENT" should read -- EMBODIMENTS --.

Column 5,  
Line 14, "intermediate" should read -- intermediate to --;  
Line 32, "DART:representation" should read -- DART representation --; and  
Line 46, "this" should read -- these --.

Column 8,  
Line 50, "indirectly" should read -- indirect --.

Column 9,  
Line 20, "image.." should read -- image. --; and  
Line 58, "these." should read -- these --.

Column 12,  
Line 57, "includes." should read -- includes --.

Column 17,  
Line 5, "bring" should read -- being --; and  
Line 6, "sad" should read -- said --.

Signed and Sealed this

Eighth Day of April, 2003

JAMES E. ROGAN  
*Director of the United States Patent and Trademark Office*